United States Patent [19]

Walter

[11] Patent Number: 5,511,637

[45] Date of Patent: Apr. 30, 1996

[54] BRAKE DEVICE

[75] Inventor: David T. Walter, Milton Keynes, England

[73] Assignee: Wichita Company Limited, England

[21] Appl. No.: 312,591

[22] Filed: Sep. 27, 1994

[30] Foreign Application Priority Data

Oct. 13, 1993 [GB] United Kingdom ............... 9321079

[51] Int. Cl.⁶ .................................................. F16D 65/09
[52] U.S. Cl. ............................. 188/73.34; 188/151 A
[58] Field of Search ........................... 188/73.2, 73.33, 188/73.34, 151 A, 352

[56] References Cited

U.S. PATENT DOCUMENTS 3,253,681  5/1966  Butler ............................. 188/73.34 X
3,610,380  10/1971  Montalvo ........................ 188/73.34 X
4,782,922  11/1988  Pearson et al. ................. 188/73.34 X Primary Examiner—Mark T. Le
Assistant Examiner—Kevin D. Rutherford
Attorney, Agent, or Firm—Seidel Gonda Lavorgna & Monaco

[57] ABSTRACT

A brake device includes actuators (31) for brake pads (30), which can be pneumatically powered to which urge the brake pads (30) into engagement with a brake disc (20). The actuators (31) are mounted on a front housing portion (2) which is pivotable on a rear housing portion (4) to open the housing and allow access to the actuators (31), as for servicing. Opening the housing causes a normally closed orifice (49) in the compressed air supply line to be opened, relieving pressure on the actuators (31), and protecting them from damage.

11 Claims, 2 Drawing Sheets

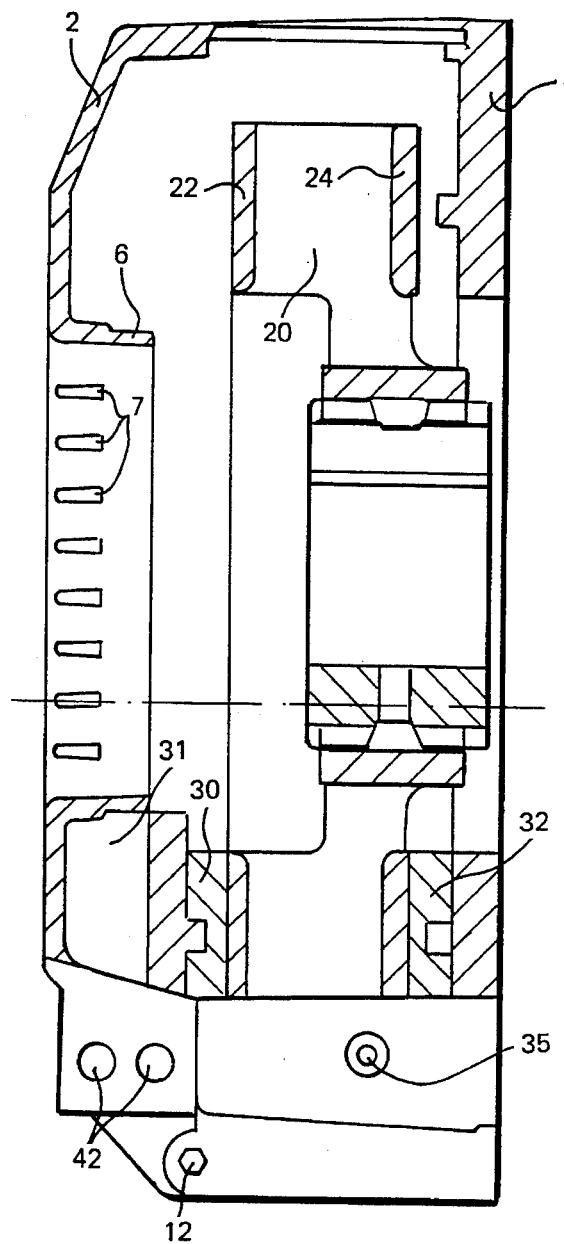
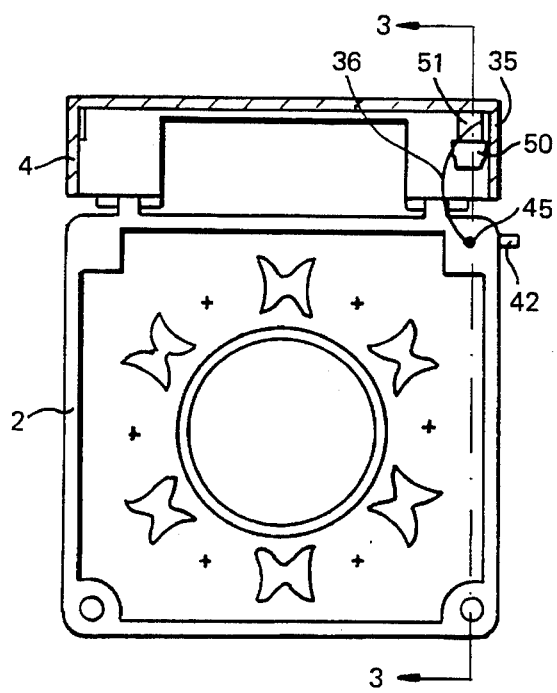
FIG. 1
FIG. 2

BRAKE DEVICE

DESCRIPTION

The invention relates to brake devices, specifically to brake devices which are operated pneumatically, that is, which include at least one pneumatic actuator operable to urge a brake pad against a brake disc.

Such brake devices are typically arranged to allow ready access to the actuators for servicing. For example, the brake device described in EP 0 219 938 A1 has actuators mounted on a door of a housing containing the brake disc, the door being hinged to the housing so that opening the door allows convenient servicing. Opening the door effects actual displacement of the actuators, as distinguished from operational movement thereof, so that the brake pads are removed from engagement with the brake disc. It is of course necessary to close off the air supply to a pneumatic brake device before any action is taken which involves spacing the brake pads away from the brake disc, because there is then no resistance to the forces urging the brake pads outwardly from the actuators, which could be destroyed as a consequence. The present invention is concerned with the provision of means eliminating the possibility of such damage in these circumstances when the air supply has inadvertently not been disconnected.

The invention thus relates to the kind of brake device in which at least one actuator can be pneumatically powered to urge a brake pad against a brake disc on a shaft to be braked, and in which the actuator can be displaced, as when servicing is required, so as to bring the brake pad out of engagement with the brake disc.

The invention provides a brake device of this kind in which the air pressure within the actuator housing is relieved as a consequence of the actuator displacement. The invention also provides a brake device of this kind in which the air supply to the actuator is at least partially diverted as a consequence of the actuator housing displacement.

Whilst it would be possible to achieve the desired pressure relief for the actuator by inclusion of a valve in the compressed air supply line which closes as a consequence of the actuator housing displacement, it is preferred to provide for relief of the air pressure supplied to the actuator by opening an alternative path. The invention is then not dependent on the correct functioning of a valve, and the opening in the air supply path can be employed to signal to the operator that he has neglected to turn off the air supply to the brake device.

Thus the invention can provide a passage communicating with the actuator and having an orifice opened to provide pressure relief on displacement of the actuator housing from its operative position. The relief orifice can conveniently be provided at a position on the supply line between the compressed air inlet to the brake device and the actuator housing. Thus, the supply line can include an orifice, or a side passage leading to such an orifice, which is normally closed by engagement with a preferably resilient plug or other closure member, but which becomes separated from the closure member as a consequence of the actuator housing displacement. The supply line to the actuator is consequently open to atmosphere immediately the actuator housing displacement begins, so that pressure within the actuator is relieved. Moreover, the noise of compressed air escaping through the orifice will alert the operator to the need to turn off the air supply.

The relief orifice and closure member are conveniently located on respective portions of a housing of the brake device, one of which is relatively movable to the other to allow access to the actuator or actuators for servicing.

The invention is further-described below, by way of example, with reference to the accompanying drawings, in which:

FIG. 1 is a sectional side view of a brake device embodying the invention, and including a housing having a front portion which is pivotably mounted on a rear portion for movement to an open position allowing access to the housing interior;

FIG. 2 is a plan view on a smaller scale of the brake device of FIG. 1, with the housing portions in an open position.

Figure 3:
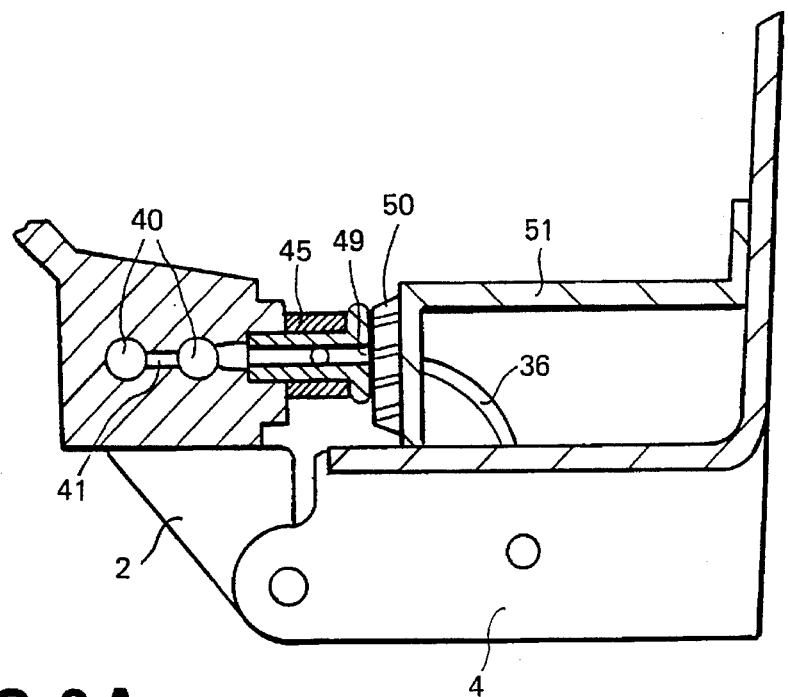
FIGS. 3A and 3B are partial sectional side views, on the line 3—3 of FIG. 2, and on a larger scale, of a selection valve unit incorporated in the brake device of FIGS. 1 and 2, in the closed and open positions of the housing, respectively.
Figure 3:
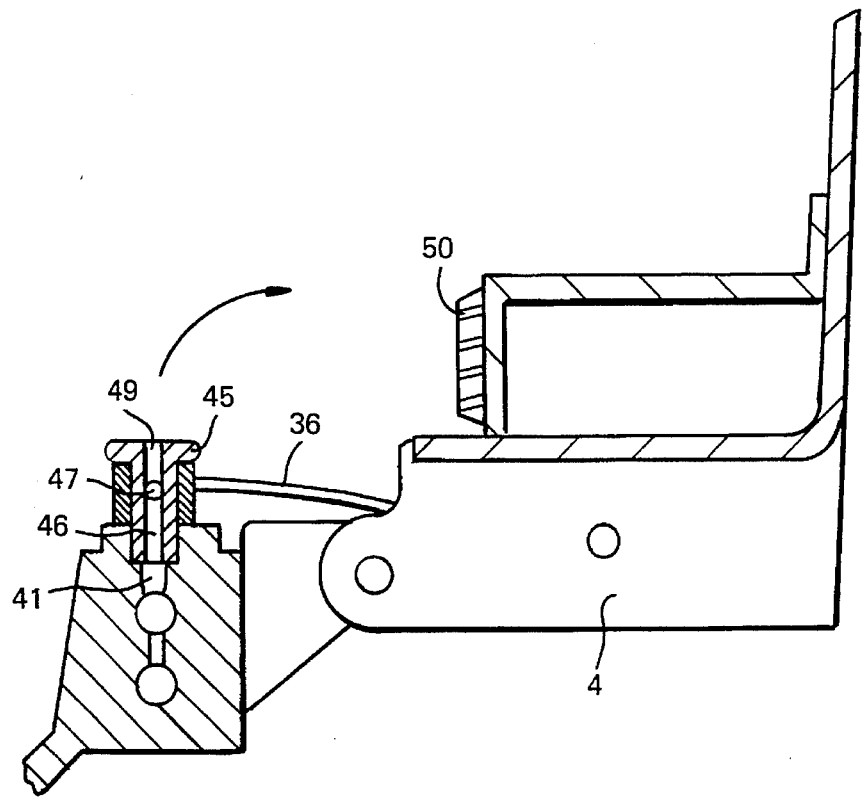

The illustrated brake device is similar in most of its features to the brake devices illustrated and described in EP 0 219 938 A1 the contents of which are incorporated herein by reference. The brake device comprises a housing having front and rear portions 2 and 4, formed as aluminium castings. The rear portion 4 has the form of a generally square open-topped box, of which the apertured base wall is connected in use to an apparatus of which a rotary shaft is to be braked. The side walls include louvres spaced so as not to unduly obstruct airflow.

The front portion 2 is also generally of the form of a square open-topped box, of which the side walls are solid, whilst the base wall, which forms the front of the housing, has an inwardly protruding sleeve portion 6 across which extend guard ribs 7, again shaped so as not to unduly obstruct airflow.

The lower corners of the front and rear portions 2 and 4 incorporate pivot bolts 12 on which the front portion can pivot downwardly through at least about 90° from the closed or operative position of FIG. 1 to an open or servicing position, for example, the position of FIG. 2 in which the front portion extends horizontally. The front portion 2 thus acts as a door for the housing. At the upper corners of the front and rear portions, fixing bolts are provided for securing the housing portions together in the closed position.

A brake disc 20 within the housing is slidably received on the shaft to be braked and comprises spaced front and rear annular walls 22 and 24 having vanes extending between them to induce a cooling airflow through the brake device. A hub projecting rearwardly from the rear wall 24 is internally splined for co-operation with splines at an end of the shaft to be braked.

The exposed outer side of the front wall 22 can be frictionally engaged by brake pads 30 carried by pneumatically powered actuators 31 mounted in the front portion 2, on operation of the actuators. A plurality, for example, eight, such brake pads 30 and actuators 31 can be arranged in the front portion 2 in a ring concentrically around the sleeve 6. The brake pads 30 are opposed by fixed brake pads mounted on the rear portion 4, for example brake pad 30 can be directly opposed axially of the shaft and brake disc 20 by a brake pad 32.

The brake device is connected to an external source of compressed air for the actuators by way of an inlet 35 located towards the lower end of one side wall of the rear housing portion 4, the connection being established by conventional means. The compressed air supply is distributed to respective actuators 31 on the front housing portion 2 by way of a selection valve unit located at a corner of the front housing portion adjacent the air inlet 35 in the rear housing portion corner. More than one such valve unit could be incorporated in the device if required. The air inlet 35 communicates with the valve unit by a feedpipe 36 which is flexible to accommodate the pivoting movement of the front housing portion 2 between its operative and open positions.

The valve unit comprises parallel adjacent bores 40 intersected by a transversely extending inlet passage 41. Each bore 40 communicates internally of the housing portion with a respective group of the actuators 31 and slidably contains a valve member 42 which can be moved manually between an open position in which the inlet passage 41 communicates with the associated actuators, and a closed position in which the valve member closes off the air inlet passage from these actuators. Operation of the brake device is effected normally by external control of the air supplied to the inlet 35, and the valve members 42 allow the user to select the actuators to which the air is fed.

The feedpipe 36 communicates with the inlet passage 41 by way of a fitting 45 secured to the front housing portion 2 so that a main bore 46 extending through the fitting from an orifice 49 at the free end of the fitting is aligned with the inlet passage. The main bore 46 communicates with a side bore 47 at which the feedpipe 36 is attached.

In the normal, operative, position of the front housing portion 2, shown in FIG. 3A, the main bore 46 is generally horizontal, and the orifice 49 is sealed by engagement of the free end of the fitting with a pad 50 of rubber or other resilient material. The pad 50 is mounted by means of a bracket 51 on the rear housing portion 4. In this position, compressed air is supplied to the actuators through the inlet 35, the flexible feedpipe 36, the side bore 47 and the main bore 46 of the fitting 45, and the passage 41 past one or both of the slide valves 42.

When the front housing portion 2 is pivoted to the open position as shown in FIG. 3B, the free end of the fitting 45 is no longer engaged with the resilient pad 50, so the actuators 31 communicate with the atmosphere, and compressed air entering from the side bore 47 can escape through the orifice 49. This situation is reached in fact just as soon as the opening movement of the front housing portion 2 is sufficient to disengage the fitting 45 from the pad 50.

There is consequentially a substantial drop in the air pressure within the actuators 31, to a level well below that at which they would be overstressed. Moreover, the noise of the air escaping through the orifice 9 is quite sufficient to alert the operator to his having failed to turn off the air supply prior to opening the housing portion. Similarly, if the compressed air supply were inadvertently turned on with the front housing portion 2 in its open position, the pressure increase within the actuators 31 would be minimal and the operator's attention would be drawn to the situation.

The invention can of course be embodied in a variety of ways other than as specifically described and illustrated.

I claim:

1. A brake device for braking a shaft, said device having:
    a brake pad;
    a brake disc mounted on said shaft;
    at least one actuator having an air supply thereto and having an operative position in which said at least one actuator can be pneumatically powered under pressure from said air supply to urge said brake pad against said brake disc, and an inoperative position in which said at least one actuator can be displaced so as to bring said brake pad out of engagement with said brake disc,
    a passage communicating with said at least one actuator, said passage having a relief orifice arranged to be opened to provide pressure relief on displacement of said at least one actuator from the operative position of the device;
    and in which, as a consequence of said displacement of said actuator, said air pressure within said at least one actuator is relieved and said air supply to said at least one actuator is at least partially diverted.

2. A brake device as claimed in claim 1, in which said brake device has a compressed air inlet for providing said air supply, and said passage comprising a supply line between said inlet and said at least one actuator.

3. A brake device as claimed in claim 2, in which said orifice is included in said supply line, or in a side passage leading from said supply line.

4. A brake device as claimed in claim 3, in which said orifice is normally closed by engagement with a closure member, and becomes separated from said closure member as a consequence of said displacement of said at least one actuator.

5. A brake device as claimed in claim 2, in which said orifice is normally closed by engagement with a closure member, and becomes separated from said closure member as a consequence of said displacement of said at least one actuator.

6. A brake device as claimed in claim 1, in which said orifice is normally closed by engagement with a closure member, and becomes separated from said closure member as a consequence of said displacement of said at least one actuator.

7. A brake device as claimed in claim 6, in which the closure member is a resilient plug.

8. A brake device for braking a shaft, said device having:
    a brake pad;
    a brake disc mounted on said shaft;
    at least one actuator having an air supply thereto;
    a passage communicating with said at least one actuator, said passage having a relief orifice;
    a closure member for said orifice and;
    a brake device housing, said housing having a first housing portion, and a second housing portion mounting said at least one actuator and being movable with respect to said first housing portion between a closed position of the housing and an open position of the housing, said relief orifice and said closure member being located on respective portions of said housing;
    and in which, in said closed position of said housing, said at least one actuator can be pneumatically powered under pressure from said air supply to urge said brake pad against said brake disc, and in said open position of said housing, said closure member is separated from said orifice to provide pressure relief, and said at least one actuator is displaced so as to bring said brake pad out of engagement with said brake disc.

9. A brake device as claimed in claim 8, comprising:
    a compressed air inlet; and
    a supply line between said inlet and said at least one actuator for providing said air supply;
    said orifice being provided in said supply line.

10. A brake device as claimed in claim 9, in which, in the open position of the housing, access to said at least one actuator is allowed for servicing.

11. A brake device as claimed in claim 8, in which, in the open position of the housing, access to said at least one actuator is allowed for servicing.

* * * * *